Patented Aug. 2, 1932

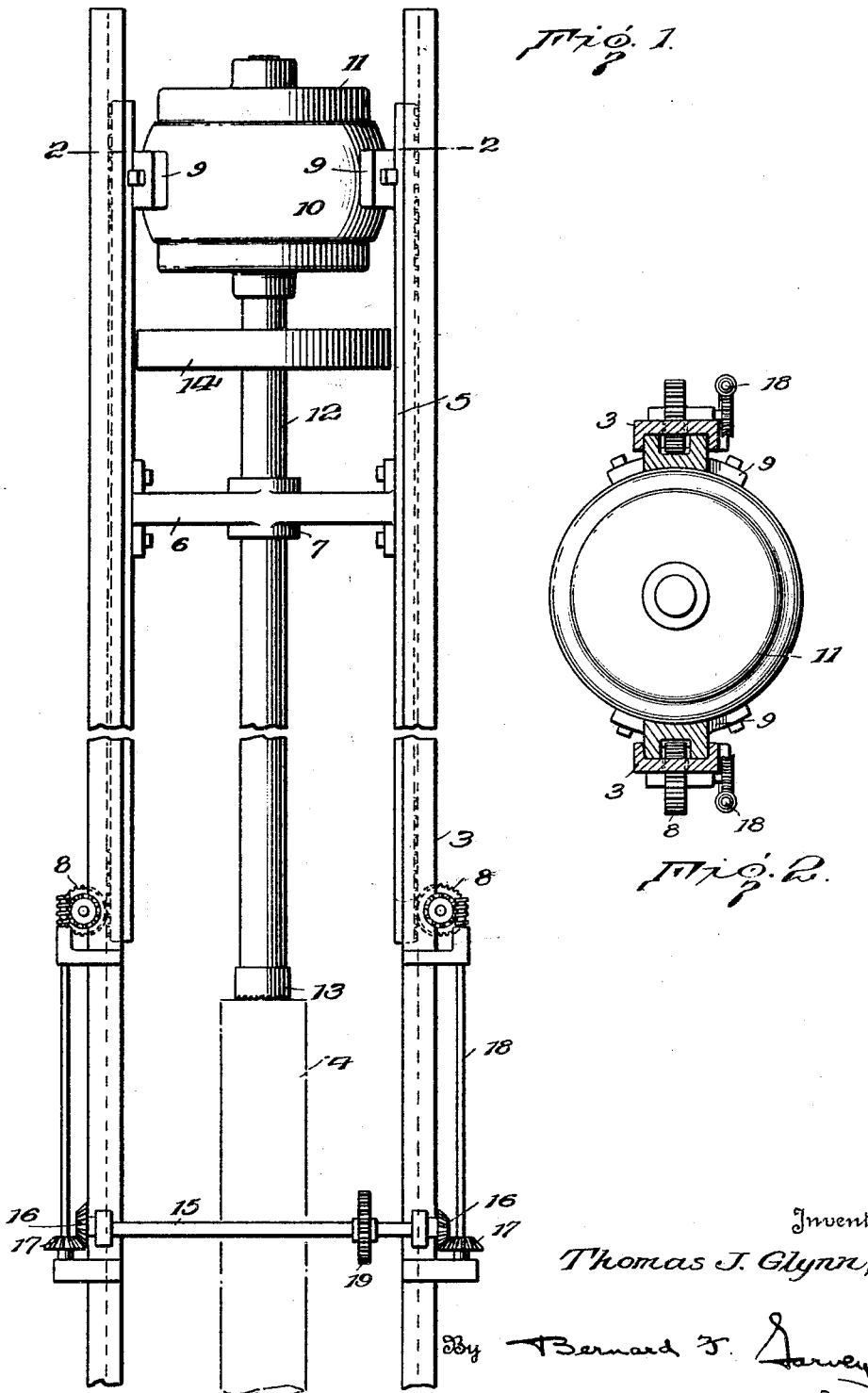

1,870,108

UNITED STATES PATENT OFFICE

THOMAS J. GLYNN, OF PITTSBURGH, PENNSYLVANIA

MECHANISM FOR SAWING TUBES FROM INGOTS

Application filed May 7, 1930. Serial No. 450,563.

The present invention consists of mechanism for sawing out tubes from cold ingots and has for an object to provide a device of extreme simplicity, which is so composed that the essential working parts effectively cut out the tube accurately and expeditiously, without lost motion.

Another object of the invention is to provide mechanism for sawing out tubes from ingots, which includes motive means for rotating the saw which is co-axial with the latter to constantly urge the same into the ingot without the aid of extraneous means and without any lost motion, in that the motive means is directly engaged with the saw shaft.

Other objects of the invention will be apparent from the following description of the present preferred form of the device, taken in connection with the accompanying drawing, wherein Fig. 1 is a fragmentary side elevational view of mechanism constructed in accordance with the present invention, illustrating the application of the same; and Fig. 2 is a transverse sectional view, taken on the line 2—2 of Fig. 1.

The device of the present invention embodies a vertical frame, generally designated 3, which consists of a pair of parallelly arranged channel irons, of U-shape conformation in cross-section, which are secured together in any desired manner and which are adapted to support an ingot 4, preferably in the center of the frame.

Slidably mounted in the frame 3 is a saw-supporting structure, comprising a pair of rack bars 5, arranged in parallelism and tied together by a bracing bar 6, which is equipped with a central bearing sleeve 7. It is of course, to be understood that the bracing bar herein shown is only for the purpose of illustrating one form of the invention. The rack bars 5 are movably mounted in the channel irons 3 and the teeth thereof are adapted for engagement with pinions 8, which are revolubly mounted on the frame 3 and extend through the channel irons, as illustrated to advantage in Fig. 2. Ears 9 are formed on the rack bars 5, adjacent the upper terminals of the latter, and are adapted for detachable engagement with a motive agent supporting casing or band 10.

Mounted in the casing or band 10 is a high-speed motor 11, which carries a tubular shaft 12, the latter extending downwardly through the bearing 7 of the bracing bar 6 and being equipped on its free end with a saw-head 13. It is of course, to be understood that instead of the saw-head, a drill bit may be mounted on the shaft 12. When the motor 11 is operated, power is transmitted to the shaft 12 to rotate the latter and correspondingly rotate the saw-head 13. Upon reference to Fig. 1 of the drawing, it will be noted that the saw-head 13, power shaft 12 and motor 11 are in axial alignment with the ingot 4. In order to prevent lateral displacement of the power shaft 12, a fly wheel 14 is mounted on the latter in proximity to the motor 11. It is apparent that as the saw is rotated, it cuts into the ingot 4 and is constantly urged toward the latter under the weight of the motor 11. In view of the vertical arrangement of the frame 3, it is apparent that the gravitation of the motor urges the saw downwardly against the ingot to automatically feed the saw during its cutting operation.

After a tube has been cut from the ingot, the motor 11 and saw may be elevated in the frame 3 by any suitable mechanism. In the present instance, I have illustrated a shaft 15, which is rotatably mounted on the frame 3 and carries gear wheels on the terminals 16 thereof, which engage in mesh with the complemental wheels 17, which are carried by vertical shafts 18. The upper ends of the latter are operatively connected to the pinions 8. The shaft 15 is equipped with a pulley 19 through the medium of which power may be transmitted to the shaft. In this way the rack bars 5 may be elevated to correspondingly elevate the motor, saw and associated parts.

It is apparent that with the device of the present invention seamless tubes may be cut from the cold ingots effectively and expeditiously. The particular arrangement of the saw and motor is of the essence of importance in that the saw is automatically fed into the ingot during rotation thereof, and the saw is suitably retained from lateral displacement so as to insure a true cut throughout the full extent of travel of the saw. Moreover, it is of course understood that different sizes of saws may be used by simply detaching the saw-head 13.

It is, of course, to be understood that various changes may be made in this device, especially in the details of construction, proportion and arrangement of parts, as come within the scope of the appended claim.

What is claimed is:—

Means for sawing seamless tubes from ingots including vertical uprights, U-shaped in cross-section, adapted to support an ingot, a saw supporting structure embodying rack bars slidably mounted in the uprights, a motor carried by said supporting structure and movable therewith, a cylindrical saw operatively engaged with said motor and depending from the latter, said saw being normally urged into engagement with the ingot under weight of the motor, and means co-acting with said rack bars to elevate said supporting structure in the uprights.

THOMAS J. GLYNN.